April 9, 1929.    A. BRZYKCY    1,708,659
ANIMAL TRAP
Filed June 25, 1928
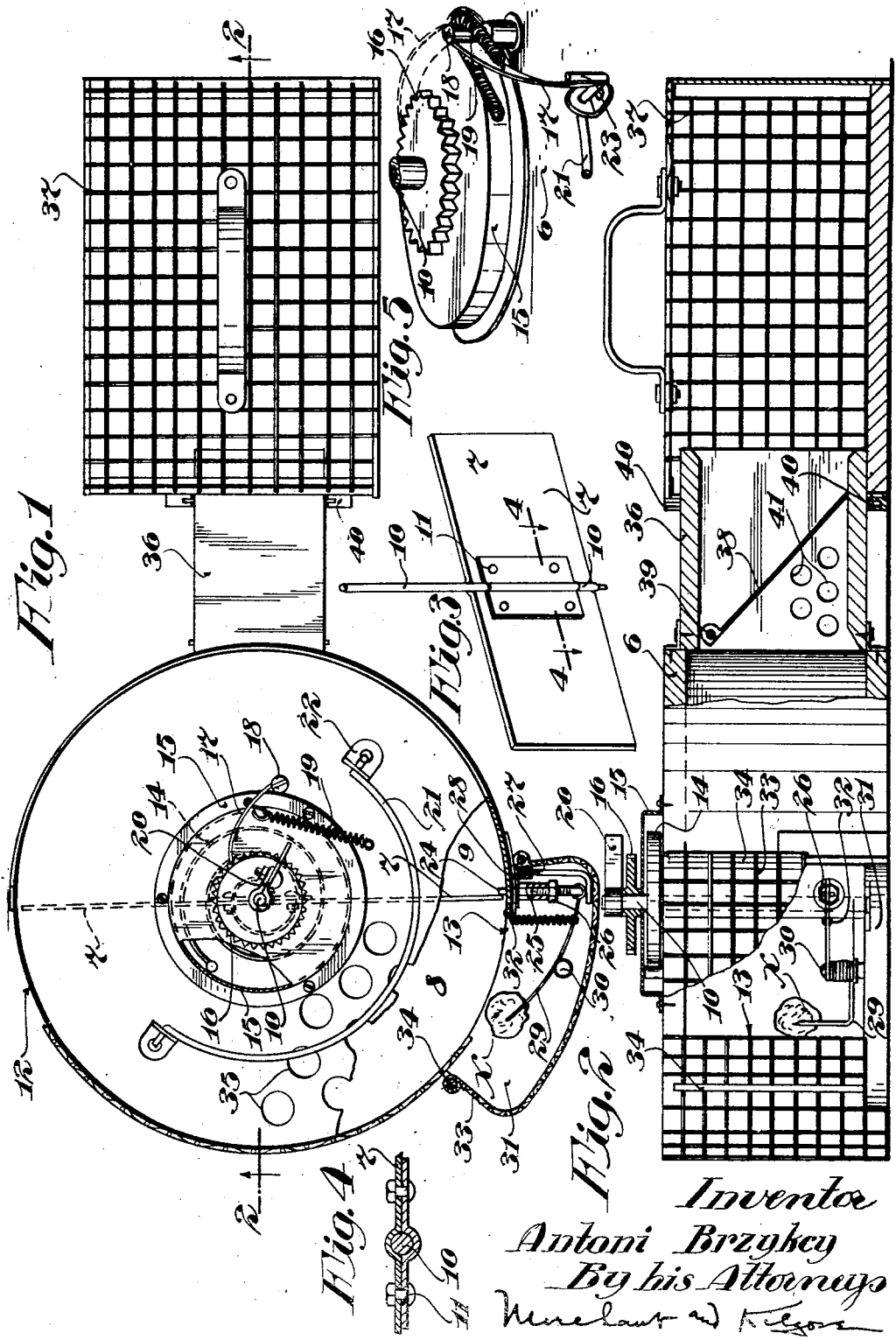
Inventor
Antoni Brzykcy
By his Attorneys Patented Apr. 9, 1929.

1,708,659

UNITED STATES PATENT OFFICE.

ANTONI BRZYKCY, OF MINNEAPOLIS, MINNESOTA.

ANIMAL TRAP.

Application filed June 25, 1928. Serial No. 288,045.

My present invention is in the nature of an improvement of my United States Letters Patent "animal trap", No. 1,645,225 of date October 11, 1927, and to this end it consists of the novel devices and combination of devices hereinafter described and defined in the claims.

In the accompanying drawings, which illustrate the invention, like characters indicate like parts throughout the several views.

Referring to the drawings:

Fig. 1 is a view principally in plan with some parts broken away and other parts sectioned;

Fig. 2 is a view partly in elevation and partly in section taken on the line 2—2 of Fig. 1;

Fig. 3 is a perspective view of the partition and its shaft;

Fig. 4 is a fragmentary detail view in section taken on the line 4—4 of Fig. 3; and Fig. 5 is a perspective view of the spring casing and parts associated therewith.

The numeral 6 indicates a cylindrical housing having a flat top and bottom. A diametrically extended partition 7 divides said housing into an entrance chamber 8 and a trap chamber 9. Said partition 7, as shown, is in the form of a flat metal plate intermediately mounted on an upright shaft 10 journaled in bearings in the top and bottom of the housing 6. This shaft 10 extend through a pair of co-operating half seats one of which is formed in the partition 7 and the other of which is formed in a plate secured to said partition by clamping bolts 11 and which shaft is frictionally held in said seats.

By thus mounting the partition 7 on the shaft 10, said partition may be readily adjusted longitudinally thereon so as to closely fit within the housing 6, but at the same time have sufficient clearance to freely rotate. The side of the housing 6 forming the entrance chamber 8 is preferably formed from a piece of wire netting so that said chamber is light. An entrance passage 12 and a diametrically opposite bait opening 13 are formed in the outer wall of the entrance chamber 8.

A clock spring 14 is provided for rotating the partition 7 in the direction from the entrance passage 12 to the bait opening 13. This spring 14 encircles the upper end of the inner end of the shaft 10 above the housing 6 and the inner end of said spring is attached to the shaft 10 and the outer end thereof is anchored to the top of the housing 6, as shown in Fig. 1. A flanged casing 15 on the top of the housing 6 is provided for the spring 14.

The partition 7 is held by a ratchet wheel 16 and a co-operating pawl 17 against backward rotation. Said ratchet wheel 16 is secured to the shaft 10 above the casing 15 and the pawl 17 is pivoted at 18 to the top of the housing 7. A coiled spring 19 attached to the pawl 17 intermediate of its ends and anchored to the casing 15, yieldingly holds said pawl in contact with the ratchet wheel 16.

On the extreme upper end portion of the shaft 10 is a winding bar 20 by which said shaft may be turned to wind the spring 14. A bail 21 by which the trap may be carried is pivoted to ears 22 on the top of the housing 6. Normally the bail 21 lies flat on the top of the housing 7 and has one of its ends bent laterally to form a stop lug 23 for holding the pawl 17 inactive during the winding of the spring 14, as shown in Fig. 5.

A lock bolt 24 is provided for normally holding the partition 7 against the action of the spring 14. This lock bolt 24 is slidably mounted in a sleeve-like keeper 25 secured to the housing 6 and projecting outward therefrom. This keeper 25 holds the lock bolt 24 for radial movement in respect to the housing 6 and with its inner end projecting into said housing in the path of rotation of the partition 7. Said lock bolt 24 is normally engaged as a stop by the partition 7 and holds the same against the action of the spring 14 and in a normal position in which it closes the trap chamber 9.

A nut 26 having screw-threaded engagement with the lock bolt 24, impinges against the outer end of the keeper 25 and affords a stop which limits the projecting movement of said lock bolt into the housing 6. A hook-like stop member 27 is arranged to be engaged by the bolt 24 to limit the retracting movement of the lock bolt 24. This stop member 27 has screw-threaded engagement with a boss 28 on the housing 6 for adjustably holding said member so that the retracting movement of the lock bolt 24 may be varied at will.

A bait holder 29 in the form of an operating lever is provided for retracting the lock bolt 24 to release the partition 7. This bait holder 29 is intermediately pivoted to an upstanding pin 30 on an outward extension 31 of the bottom member of the housing 6. One end of the bait holder 29 is attached to the upturned outer end of the lock bolt 24 and the other end thereof is adapted to hold a piece of bait x at the bait opening 13 and just outside of the entrance chamber 8. A light coiled spring 32 attached to the bait holder 29 and anchored to the housing 6 yieldingly holds the lock bolt 24 projected.

A secondary housing 33 normally closes the bait passage 13 and encases the lock bolt 24 and bait holder 29 so that the bait x cannot be taken from the outside of the chamber 8. This secondary housing 33 is preferably made from a piece of wire netting and is removably held in position on posts 34 anchored to the extension 31. A plurality of light openings 35 are formed in the top of the housing 6 in the vicinity of the bait opening 13.

Leading from the trap chamber 9 is a radially extended passageway 36, the outer end portion of which extends into a door opening in a wire cage 37. Within the passageway 36 is an inclined gravity-closed door 38 hinged at 39 to the sides of the passageway 36. This door 38 is arranged to be opened only by a movement of an animal through the passageway 36 from the trap chamber 9 to the cage 37. At the sides of the door opening in the cage 37 are vertical guides 40 adapted to receive a sliding door plate, not shown, for closing the cage 37. A plurality of light openings 41 are formed in the sides of the passageway 36 at the side of the door 38 toward the trap chamber 9.

An animal attracted by the bait x will enter the entrance chamber 8 through the entrance passage 12 and in an attempt to remove said bait from the bait holder 29 will move the bait holder 29 on its pivot 30 and thereby retract the lock bolt 24 and release the partition 7. Upon the release of the partition 7 the spring 14 gives the same a powerful rotary movement which sweeps the animal from the entrance chamber 8 into the trap chamber 9. When the bait x is released by the animal, the spring 32 immediately projects the lock bolt 24 so that it is again engaged by the partition 7 after making a half rotation, and which lock bolt and the ratchet devices 16 and 17 securely hold said partition against movement in either direction so that the trapped animal cannot escape.

The trap chamber 9 is dark and the light openings 41 at the door 38 will attract the animal and in its attempt to get out, will lift the gravity-held door 38 and pass thereunder through the passageway 36 into the cage 37. After the animal has passed into the cage 37 the door 38 will return to normal position and thereby prevent the escape of the animal in the cage 37. The sliding door heretofore referred to may be inserted into the guides 40 after the cage 37 is moved sufficiently to afford clearance for the door outward of the passageway 36.

What I claim is:

1. A trap comprising a housing having a rotatable partition dividing the housing into an entrance chamber and a trap chamber, said entrance chamber having an entrance passage, a clock spring for rotating the partition, means for winding the clock spring, a pawl and ratchet device for holding the partition against backward rotation, a spring-projected lock bolt normally holding the partition against the action of the spring, and a movable bait holder mounted in the housing and arranged to operate the lock bolt to release the partition by a movement of the bait holder to remove the bait therefrom.

2. The structure defined in claim 1 in further combination with a movable bait on the housing having a stop lug arranged to releasably hold the pawl of said device inoperative during the winding of the spring.

3. A trap comprising a housing having a rotatable partition dividing the housing into an entrance chamber and a trap chamber, said entrance chamber having an entrance passage, power means under strain to rotate the partition, a pawl and ratchet device for holding the partition against backward rotation, a spring-projected lock bolt normally holding the partition against the action of the spring, and a movable bait holder comprising an intermediately pivoted operating lever, one end of which is attached to the lock bolt and the other end of which is adapted to hold a piece of bait.

4. A trap comprising a housing having a rotatable partition dividing the housing into a light entrance chamber and a dark trap chamber, said entrance chamber having an entrance passage, power means under strain to rotate the partition, an automatically set stop member normally holding the partition, a bait holder arranged to release the stop member by a movement of the bait holder to remove the bait therefrom, a cage, a dark passageway leading from the trap chamber to the cage, and a yieldingly held door normally closing the passageway and arranged to be opened only by a movement thereof toward the cage, said passageway having a light opening at the side of the door toward the trap chamber.

In testimony whereof I affix my signature.

ANTONI BRZYKCY.